(12) United States Patent
Park et al.

(10) Patent No.: US 9,887,405 B2
(45) Date of Patent: Feb. 6, 2018

(54) CROSSLINKED POLYOLEFIN SEPARATOR AND METHOD OF PREPARING THE SAME

(71) Applicant: LG CHEM, LTD., Seoul (KR)

(72) Inventors: Cheon-Il Park, Daejeon (KR); Won-Sik Bae, Daejeon (KR); Bi-Oh Ryu, Daejeon (KR); Kyoung-Min Kim, Daejeon (KR); Heon-Sik Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 213 days.

(21) Appl. No.: 14/928,721

(22) Filed: Oct. 30, 2015

(65) Prior Publication Data

US 2016/0126518 A1 May 5, 2016

(30) Foreign Application Priority Data

Oct. 31, 2014 (KR) .......................... 10-2014-0150606
Oct. 22, 2015 (KR) .......................... 10-2015-0147516

(51) Int. Cl.
| | | |
|---|---|---|
| *B29C 35/02* | (2006.01) | |
| *B29C 35/04* | (2006.01) | |
| *H01M 10/00* | (2006.01) | |
| *H01M 2/14* | (2006.01) | |
| *B29C 47/00* | (2006.01) | |
| *H01M 2/16* | (2006.01) | |
| *B29K 23/00* | (2006.01) | |
| *B29K 105/04* | (2006.01) | |
| *B29L 31/34* | (2006.01) | |
| *H01M 10/052* | (2010.01) | |
| *B29C 47/88* | (2006.01) | |

(52) U.S. Cl.
CPC .......... *H01M 2/145* (2013.01); *B29C 35/041* (2013.01); *B29C 47/0021* (2013.01); *B29C 47/0057* (2013.01); *H01M 2/1653* (2013.01); *B29C 47/8845* (2013.01); *B29K 2023/00* (2013.01); *B29K 2105/04* (2013.01); *B29K 2995/0007* (2013.01); *B29L 2031/3468* (2013.01); *H01M 10/052* (2013.01)

(58) Field of Classification Search
CPC .............. B29C 35/041; B29C 47/0021; B29C 47/0057
See application file for complete search history.

(56) References Cited

U.S. PATENT DOCUMENTS

| | | | |
|---|---|---|---|
| 3,646,155 A | 2/1972 | Scott | |
| 4,870,136 A | 9/1989 | Yagi et al. | |
| 6,558,607 B1 * | 5/2003 | Winter | ..................... C08J 9/141 264/41 |
| 2015/0056492 A1 * | 2/2015 | Huang | .................. H01M 2/145 429/145 |

FOREIGN PATENT DOCUMENTS

| | | |
|---|---|---|
| CN | 1863831 A | 11/2006 |
| CN | 102134342 A | 7/2011 |
| CN | 102888016 A | 1/2013 |
| CN | 103347936 A | 10/2013 |
| JP | 11-144700 A | 5/1999 |
| JP | 11-172036 A | 6/1999 |
| JP | 2001-176484 A | 6/2001 |
| JP | 2009070620 A * | 4/2009 |
| JP | 2009070620 A | 4/2009 |
| JP | 2010244874 A | 10/2010 |
| JP | 5344970 B2 * | 11/2013 |
| JP | 5594185 B2 | 9/2014 |
| KR | 10-1995-0013728 B1 | 11/1995 |

OTHER PUBLICATIONS

Office Action of Chinese Patent Office in Appl'n No. 201510729187.3, dated Jul. 21, 2017.
Office Action of Korean Patent Office in Appl'n No. 10-2015-0147516, dated Jul. 31, 2017.

* cited by examiner

*Primary Examiner* — Kara B Boyle
(74) *Attorney, Agent, or Firm* — Dentons US LLP

(57) ABSTRACT

Disclosed is a method of preparing a crosslinked polyolefin separator including preparing a silane grafted polyolefin solution using a polyolefin having a weight average molecular weight higher than or equal to 200,000, a diluent, an alkoxy group containing vinylsilane, and an initiator, forming the silane grafted polyolefin solution in a sheet shape and stretching, extracting the diluent from the stretched sheet to produce a porous membrane, and crosslinking the porous membrane in the presence of water, and a crosslinked polyolefin separator.

10 Claims, 1 Drawing Sheet

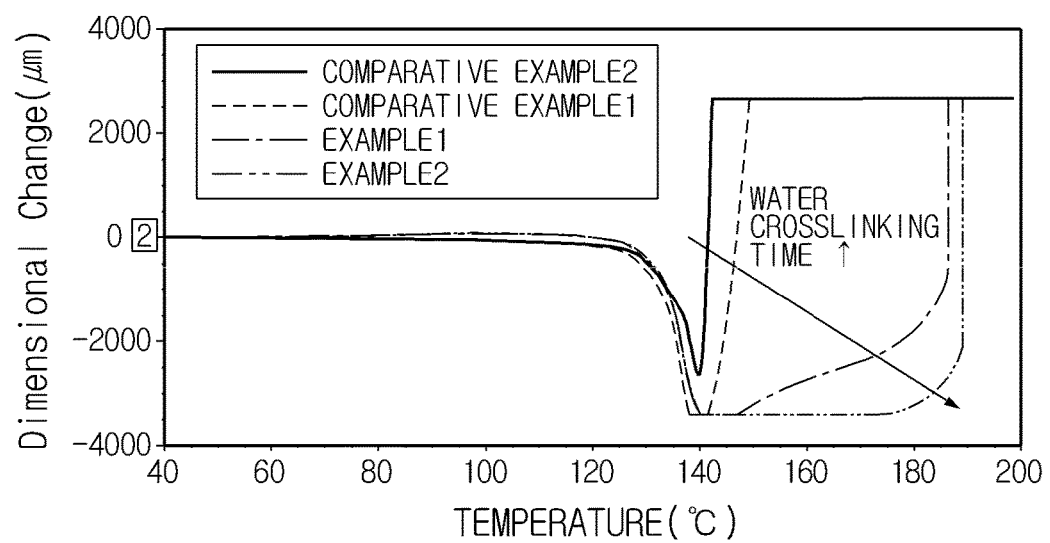

CROSSLINKED POLYOLEFIN SEPARATOR AND METHOD OF PREPARING THE SAME

FIELD OF THE DISCLOSURE

The present disclosure relates to a crosslinked polyolefin separator with very high heat resistance and a method of preparing the same.

This application claims priority to Korean Patent Application No. 10-2014-0150606 filed in the Republic of Korea on Oct. 31, 2014 and Korean Patent Application No. 10-2015-0147516 filed in the Republic of Korea on Oct. 22, 2015, the disclosures of which are incorporated herein by reference.

DESCRIPTION OF THE RELATED ART

A secondary battery is a chemical battery that can be used semipermanently by continuously repeating charge and discharge using an electrochemical reaction, and can be classified into a lead storage battery, a nickel-cadmium battery, a nickel-hydrogen battery, and a lithium secondary battery. Among them, a lithium secondary battery has a higher voltage and better energy density characteristics than the others, and thus is taking the lead in the secondary battery market. Also, based on the type of an electrolyte, a lithium secondary battery can be divided into a lithium ion battery using a liquid electrolyte and a lithium ion polymer battery using a solid electrolyte.

A lithium secondary battery includes a positive electrode, a negative electrode, an electrolyte solution, and a separator, and the separator of the lithium secondary battery is required to separate the positive electrode from the negative electrode to provide electrical isolation and increase lithium ion permeability based on high porosity to improve ionic conductivity. A typical polymer material of the separator mainly includes polyolefin such as, for example, polyethylene, which is advantageous for pore formation, and has chemical resistance, excellent mechanical properties and electrical insulation properties, and is low-cost.

However, because polyethylene has a melting point as low as about 130° C., in the event of heat generation in the battery, dimensional stability is lost and shrinkage and deformation occurs at high temperatures above the melting point. In this case, the positive electrode and the negative electrode come into contact with each other, causing an internal short and a thermal runaway, and in some instances, even a fire.

To improve the low thermal characteristics, approaches to prevent a thermal runaway at high temperature using a method of coating an inorganic material or a heat resistant polymer on the surface of polyethylene have been developed.

Polyethylene has low thermal characteristics, but when crosslinked, polyethylene increases in heat resistance, allowing it to be used at high temperature.

In practice, crosslinked polyethylene is being used for insulation of an electrical line and water supply piping. Crosslinking of polyethylene includes crosslinking using a peroxide-based initiator, water crosslinking using a silane material, and electron beam crosslinking. The crosslinking using a peroxide-based initiator is not suitable for a separator preparation process including stretching, and the electron beam crosslinking has a disadvantage of a very high investment cost of equipment and installation.

Therefore, there is still a need for development of an approach to improve low thermal characteristics of polyolefin, such as, including polyethylene.

SUMMARY

Technical Problem

The present disclosure is directed to providing a crosslinked polyolefin separator with very high heat resistance and a method of preparing the same.

Technical Solution

According to one aspect of the present disclosure, there is provided a method of preparing a crosslinked polyolefin separator including the steps for preparing a silane grafted polyolefin solution using a polyolefin having a weight average molecular weight higher than or equal to 200,000, a diluent, an alkoxy group containing vinylsilane, and an initiator, extruding the silane grafted polyolefin solution, forming in a sheet shape, and stretching, extracting the diluent from the stretched sheet to produce a porous membrane, and crosslinking the porous membrane in the presence of water.

The step for preparing a silane grafted polyolefin solution may include feeding a polyolefin, a diluent, an alkoxy group containing vinylsilane, and an initiator into an extruder, mixing them, and performing reactive extrusion.

A weight ratio between the polyolefin and the diluent in the silane grafted polyolefin solution may range from 50:50 to 20:80.

A content of the alkoxy group containing vinylsilane in the silane grafted polyolefin solution may be 0.1 parts by weight to 10 parts by weight per the total 100 parts by weight of the polyolefin and the diluent, and a content of the initiator in the silane grafted polyolefin solution may be 0.2 parts by weight to 100 parts by weight per 100 parts by weight of the alkoxy group containing vinylsilane.

The polyolefin may include polyethylene; polypropylene; polybutylene; polypentene: polyhexene: polyoctene: copolymers of at least two of ethylene, propylene, butene, pentene, 4-methylpentene, hexene and octene; or mixtures thereof.

The diluent may include at least one selected from the group consisting of paraffin oils, mineral oils, waxes, soybean oils, phthalic acid esters, aromatic ethers, fatty acids having 10 to 20 carbon atoms, fatty acid alcohols having 10 to 20 carbon atoms, and fatty acid esters.

The alkoxy group containing vinylsilane may be at least one selected from the group consisting of trimethoxyvinylsilane, triethoxyvinylsilane, and triacetoxyvinylsilane.

The step for forming in a sheet shape and stretching may include extruding the silane grafted polyolefin solution through a die to form an extruded product, cooling the extruded product and forming in a sheet shape, and stretching the product formed in a sheet shape sheet biaxially in a longitudinal direction and a transverse direction to form a stretched sheet.

The preparing method may further include, before the crosslinking, the step for heat-setting the porous membrane.

The crosslinking step may be performed on the porous membrane under the conditions of 50° C. to 100° C. of temperature and 50% to 100% of humidity.

According to another aspect of the present disclosure, there is provided a silane crosslinked polyolefin separator having a meltdown temperature higher than or equal to 150° C. and a puncture strength of from 10 gf/μm to 50 gf/μm.

The crosslinked polyolefin separator may have a degree of crosslinking higher than or equal to 50%.

According to another aspect of the present disclosure, there is provided a lithium secondary battery including the crosslinked polyolefin separator.

Advantageous Effects

According to the present disclosure, a lithium ion battery using a polyolefin separator with heat resistant properties improved through crosslinking provides high temperature stability.

Particularly, with the use of the silane water crosslinking method which grafts a silane group onto polyethylene, forms a final product, and performs crosslinking in the presence of water, the present disclosure has no limitation in a separator preparation process including stretching, and an advantage of eliminating separate investment for equipment and installation and thus requiring little cost incurred therein, and as a result, it provides a crosslinked polyolefin separator with a very high heat resistance that is less vulnerable to thermal shrinkage at high temperatures.

BRIEF DESCRIPTION OF THE DRAWINGS

FIG. 1 is a thermomechanical analysis (TMA) curve graph of separators of examples 1 and 2 and comparative examples 1 and 2.

DESCRIPTION OF EXEMPLARY EMBODIMENTS

Hereinafter, the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A method of preparing a crosslinked polyolefin separator according to one aspect of the present disclosure includes the steps for preparing a silane grafted polyolefin solution using a polyolefin a weight average molecular weight higher than or equal to 200,000, a diluent, an alkoxy group containing vinylsilane, and an initiator, forming the silane grafted polyolefin solution in a sheet shape and stretching, extracting the diluent from the stretched sheet to produce a porous membrane, and crosslinking the porous membrane in the presence of water.

First, the preparing method starts with the step for preparing a silane grafted polyethylene solution using a polyolefin, a diluent, an alkoxy group containing vinylsilane, and an initiator.

The polyolefin includes polyethylene; polypropylene; polybutylene; polypentene: polyhexene: polyoctene: copolymers of at least two of ethylene, propylene, butene, pentene, 4-methylpentene,hexene and octene, or mixtures thereof.

Particularly, the polyethylene includes low density polyethylene (LDPE), linear low density polyethylene (LLDPE), and high density polyethylene (HDPE), and among them, high density polyethylene having high crystallinity and a high melting point of resin is the most desirable.

The polyolefin has a weight average molecular weight higher than or equal to 200,000, preferably between 220,000 and 800,000, more preferably between 250,000 and 500,000, and even more preferably between 300,000 and 450,000. In the present disclosure, a high molecular weight polyolefin having a weight average molecular weight higher than or equal to 200,000 is used as a starting material of separator preparation, to greatly improve the properties of a finally obtained separator, such as, including strength and heat resistance.

The diluent includes liquid or solid paraffins, waxes, and soybean oils that are commonly used in a wet process for separator preparation.

Also, the diluent may include diluents that induce liquid-liquid phase separation with polyolefin, for example, phthalic acid esters such as including dibutyl phthalate, dihexyl phthalate, and dioctyl phthalate; aromatic ethers such as including diphenyl ether and benzyl ether; fatty acids having 10 to 20 carbon atoms such as including palmitic acid, stearic acid, oleic acid, linoleic acid, and linolenic acid; fatty acid alcohols having 10 to 20 carbon atoms such as including palmityl alcohol, stearyl alcohol, and oleyl alcohol; and a fatty acid ester derived from esterification of one or more saturated or unsaturated fatty acid having from 4 to 26 carbon atoms in the fatty acid group and an alcohol having from 1 to 8 hydroxy group(s) and from 1 to 10 carbon atom(s), such as palmitic acid mono-, di- or triester, stearic acid mono-, di- or triester, oleic acid mono-, di- or triester, linoleic acid mono-, di- or triester, and the like.

Also, the diluent may include mixtures of at least two of the above substances.

A weight ratio of the polyolefin to the diluent in the silane grafted polyolefin solution may be in the range of 50:50 to 20:80, preferably 40:60 to 30:70. When the weight ratio is more than 50:50, that is, the content of the polyolefin is high, the porosity reduces, the pore size decreases, interconnection of the pores is insufficient, and the permeability significantly reduces, while the viscosity of the polyolefin solution increases and the extrusion load increases, making processing difficult. When the weight ratio is less than 20:80, that is, the content of the polyolefin is low, the blending of the polyolefin and the diluent reduces and they are not thermodynamically miscible and are extruded in gel form, causing a problem with fracture during stretching and non-uniform thickness, and the prepared separator may reduce in strength.

The alkoxy group containing vinylsilane includes trimethoxyvinylsilane, triethoxyvinylsilane, and triacetoxyvinylsilane, singly or in combination. The alkoxy group containing vinylsilane undergoes grafting onto polyolefin by a vinyl group and a water crosslinking reaction by an alkoxy group, and acts on crosslinking the polyolefin.

The content of the alkoxy group containing vinylsilane is 0.1 to 10 parts by weight, preferably 0.1 to 5 parts by weight, and more preferably 0.5 to 2 parts by weight, per the total 100 parts by weight of the polyolefin and the diluent. When the content of the alkoxy group containing vinylsilane satisfies the range, it is possible to prevent the problems such as a reduced graft yield and a reduced degree of crosslinking due to the low silane content, or a bad appearance of an extruded sheet caused by the remaining unreacted silane due to the high silane content.

The initiator may include initiators that can produce radicals, for example, benzoyl peroxide, acetyl peroxide, dilauryl peroxide, di-ter-butyl peroxide, dicumyl peroxide, cumyl peroxide, hydrogen peroxide, and potassium persulfate, but is not limited thereto.

The content of the initiator is 0.2 to 100 parts by weight, preferably 1 to 50 parts by weight, and more preferably 2 to 10 parts by weight, per 100 parts by weight of the alkoxy group containing vinylsilane. When the content of the initiator satisfies the range, it is possible to prevent the problems such as a reduced silane graft yield due to the low initiator content, or crosslinking between polyethylene in an extruder due to the high initiator content.

The silane grafted polyethylene solution may further include a crosslinking catalyst to promote crosslinking in the presence of water, i.e., water crosslinking, when needed, and in addition, the composition may further include general additives, such as, including an oxidation stabilizer, a UV stabilizer, an antistatic agent, and a nucleating agent to enhance particular functions when needed.

The step for preparing a silane grafted polyolefin solution may include feeding a polyolefin, a diluent, an alkoxy group containing vinylsilane and an initiator into an extruder at the same time, mixing them, and performing reactive extrusion.

The traditional process is performed in the manner of, before reactive extrusion, preparing a silane grafted polyolefin through a reaction between polyolefin and a vinylsilane compound, and carrying out reactive extrusion of the prepared silane grafted polyolefin together with a solvent such as a diluent, so it has a procedural limitation of having to take multiple steps.

However, according to an embodiment of the present disclosure, a non-silane grafted polyolefin, a diluent, an alkoxy group containing vinylsilane, and an initiator are all fed into an extruder at the same time, and a silane grafted polyolefin solution is prepared through a reaction between the polyolefin and the alkoxy group containing vinylsilane during reactive extrusion. That is, a silane grafted polyolefin solution can be prepared by a single continuous process with no need to perform a preprocessing step, i.e., silane grafting of polyolefin, thereby eliminating the need for additional installation investment, which is very advantageous in terms of cost and process.

At the step for preparing a silane grafted polyolefin solution, the polyolefin and the diluent are present together as starting materials. Particularly, as a high molecular weight polyolefin having a weight average molecular weight higher than or equal to 200,000 is used as the polyolefin in the present disclosure as described above, if a diluent is absent in the preparation of a silane grafted polyolefin solution, reactive extrusion of the high molecular weight polyolefin is impossible. However, because the present disclosure uses a diluent as a starting material together with the polyolefin and the alkoxy containing vinyl silane, the diluent serves as a lubricant in the reactive extrusion to allow a silane grafting reaction of the high molecular weight polyolefin and extrusion. In this instance, the reactive extrusion condition may last at the temperature between 160° C. and 240° C. for a few minutes using a single or twin screw extruder device. The alkoxy group containing vinylsilane and the initiator may be injected into each metering pump via side ports of the extruder. For uniform reactive extrusion, the screw preferably has an L/D (length/diameter) greater than or equal to 30.

Subsequently, the silane grafted polyolefin solution is formed in a sheet shape through compression, followed by stretching.

The extrusion processing uses a common single or twin screw extruder. The extrusion condition, the stretching condition, and the heat-setting condition are not different from ordinary separator processing condition ranges.

According to an embodiment of the present disclosure, the step for forming in a sheet shape and stretching may include extruding the silane grafted polyolefin solution through a die to form an extruded product; cool the extruded product and form in a sheet shape; and stretching the product formed in a sheet shape biaxially in the longitudinal direction and the transverse direction to form a stretched sheet.

That is, the silane grafted polyolefin solution obtained through reactive extrusion may be extruded using an extruder with a T dice, and cooled by a typical casting or calendaring method using water cooling and air cooling, yielding a cooled extruded product.

Subsequently, the cooled extruded product is stretched to form a sheet.

When the sheet is formed using a high molecular weight polyolefin having a weight average molecular weight higher than or equal to 200,000 such as that of the present disclosure, a stretch processing step is possible, and as a result, the enhanced properties such as including the strength and the puncture strength required for a separator for a secondary battery may be imparted.

In contrast, when the sheet is formed using a low molecular weight polyolefin, fracture occurs during a stretching process, making it difficult to accomplish a desired magnification level of stretching.

According to an embodiment of the present disclosure, the stretching may be performed by successive or simultaneous stretching using a roll or a tenter. A stretch ratio is three times or more each in the longitudinal direction and the transverse direction, preferably, between 5 times and 10 times, and a total stretch ratio is preferably between 20 times and 80 times. If the stretch ratio in one direction is less than 3 times, orientation in one direction is insufficient, and at the same time, the property balance between the longitudinal direction and the transverse direction is broken and the tensile strength and puncture strength reduces. Also, when the total stretch ratio is less than 20 times, non-stretching occurs and pore formation is not achieved, and when the total stretch ratio is more than 80 times, fracture occurs during stretching and shrinkage of a final film increases.

In this instance, a stretching temperature may change based on a melting point of the polyolefin used and a concentration and a type of the diluent, and preferably, the stretching temperature is selected within a temperature range in which 30 wt % to 80 wt % of crystalline domains of the polyolefin in the film melt.

When the stretching temperature is selected within a temperature range lower than the temperature at which 30 wt % of crystalline domains of the polyolefin in the sheet molding product melt, softness of the sheet is low, stretching is poor, and the likelihood that fracture will occur during stretching is high, and at the same time, non-stretching occurs. In contrast, when the stretching temperature is selected within a temperature range higher than the temperature at which 80 wt % of crystalline domains melt, stretching is easy and non-stretching is less likely to occur, but due to partial over-stretching, a thickness deviation occurs, and an orientation effect of the polyolefin are low, and thus, the properties significantly degrade. On the other hand, an extent to which the crystalline domains melt based on temperature may be acquired from differential scanning calorimeter (DSC) analysis of the sheet.

Subsequently, the diluent is extracted from the obtained stretched sheet to produce a porous membrane. Specifically, the diluent is extracted from the porous membrane using an organic solvent, followed by drying, and in this instance, available organic solvents are not limited to a particular type and include any solvent capable of extracting the diluent used in the resin extrusion. For example, desirable organic solvents include methyl ethyl ketone, methylene chloride, and hexane that have high extraction efficiency and are dried quickly.

The extraction method includes all general solvent extraction methods, such as, including an immersion method, a solvent spray method, and an ultrasonic method, singly or in combination. The content of the diluent remaining after extraction processing is preferably less than or equal to 1 wt %. When the content of the remaining diluent is higher than 1 wt %, the properties degrade and the permeability of the porous membrane reduces. The content of the remaining diluent may be affected by the extraction temperature and the extraction time, and to increase the solubility of the diluent and the organic solvent, the higher extraction temperature is better, but considering the safety issue associated with the boiling of the organic solvent, 40° C. or lower is desirable. When the extraction temperature is lower than or equal to a freezing point of the diluent, extraction efficiency greatly drops, so the extraction temperature should be certainly higher than the freezing point of the diluent.

Also, the extraction time may change based on a thickness of the prepared porous membrane, but for a 10 μm to 30 μm thick porous membrane, 2 to 4 minutes are proper.

According to an embodiment of the present disclosure, the preparing method may further include a heat-setting step between the step for extracting the diluent from the sheet to produce a porous membrane and the step for crosslinking the porous membrane.

That is, the dried porous membrane may undergo a heat-setting step as needed, for example, in the applications of a separator for a battery, when there is a need to reduce residual stress to reduce a high temperature shrinkage rate of a final separator less than or equal to 5% each in the longitudinal direction and the transverse direction.

The heat-setting works to forcibly eliminate the tendency of the porous membrane to shrink and remove residual stress by applying heat to the porous membrane in fixed state. The high heat-setting temperature is favorable in reducing a shrinkage rate, but when the heat-setting temperature is too high, the porous membrane partially melts and the formed micropores are clogged, resulting in reduced permeability.

Preferably, the heat-setting temperature is selected within a temperature range in which 10 to 30 wt % of crystalline domains of the film melt. When the heat-setting temperature is selected within a temperature range lower than the temperature at which 10 wt % of crystalline domains of the porous membrane melt, rearrangement of polyolefin molecules in the film is insufficient and there is no effect on residual stress removal of the porous membrane, and when the heat-setting temperature is selected within a temperature range higher than the temperature at which 30 wt % of crystalline domains of the film melt, micropores are clogged due to partial melting, resulting in reduced permeability.

The heat-setting time is relatively short when the heat-setting temperature is high, and is relatively long when the heat-setting temperature is low. Preferably, 5 seconds to 1 minute is proper.

Subsequently, the porous membrane produced by extracting the diluent undergoes a crosslinking step in the presence of water. The crosslinking may be performed by placing it a steady temperature and humidity room of the temperature between 50° C. and 100° C., more preferably between 60° C. and 90° C., and humidity between 50% and 100%, more preferably between 70% and 100%, or putting it in hot water or boiling water for a few hours or days.

When the crosslinking temperature and humidity satisfies the range, a crosslinking rate increases, and the problem with deformation of the membrane caused by melting of some polyolefin crystals at high temperatures is prevented.

To promote the crosslinking reaction, a crosslinking catalyst may be used. Generally, the crosslinking catalyst includes carboxylate salts of metals, such as, including tin, zinc, iron, lead, and cobalt, organic bases, inorganic acids and organic acids. Specifically, the crosslinking catalyst includes dibutyl tin dilaurate, tin(II) acetate, tin(II) caprylate, zinc naphthenate, zinc caprylate, ethylamine, dibutylamine, hexylamine, pyridine, inorganic acid (such as sulfuric acid, chloric acid, and the like), organic acid (such as toluene sulfonic acid, acetic acid, stearic acid, maleic acid, and the like).

The use of the crosslinking catalyst includes adding the crosslinking catalyst when preparing the silane grafted polyethylene solution, and applying a solution or dispersion of the crosslinking catalyst to the porous membrane.

Where the catalyst is added when preparing the silane grafted polyethylene solution, the content of the crosslinking catalyst ranges from 0.0001 wt % to 5 wt % of the silane grafted polyethylene solution. Where the crosslinking catalyst is applied to the porous membrane, the concentration of the crosslinking catalyst is adjusted to the range between 0.001 wt % and 30 wt % of a solution or dispersion of the crosslinking catalyst.

According to another aspect of the present disclosure, there is provided a crosslinked polyolefin separator prepared by the foregoing preparing method.

According to still another aspect of the present disclosure, there is a silane crosslinked polyolefin separator having a meltdown temperature higher than or equal to 150° C. and a puncture strength of from 10 gf/μm to 600 gf/μm.

Specifically, the crosslinked polyolefin separator has a meltdown temperature higher than or equal to 150° C., preferably between 160° C. and 220° C., more preferably between 170° C. and 210° C., and even more preferably between 180° C. and 200° C. In this instance, the meltdown temperature refers to a temperature at rupture after the separator shrinks and expands under a load of 0.01N applied to the separator using a thermomechanical analysis (TMA) at a temperature increasing rate of 5° C./min.

Because of having the high meltdown temperature above 150° C., the crosslinked polyolefin separator maintains high temperature melt integrity and has excellent dimensional stability.

Furthermore, the crosslinked polyolefin separator has a puncture strength between 10 gf/μm and 50 gf/μm, preferably between 15 gf/μm and 40 gf/μm, more preferably between 17 gf/μm and 37 gf/μm, and even more preferably between 18 gf/μm and 36 gf/μm. In this instance, the puncture strength is calculated by measuring the strength at rupture when pressing down the porous membrane using a needle having a diameter of 1 mm (a radius of curvature: 0.5 mm) at a rate of 2 mm/sec, and dividing the strength by the thickness of the porous membrane.

In addition, the crosslinked polyolefin separator according to an embodiment of the present disclosure has a degree of crosslinking higher than or equal to 50%, preferably between 60% and 90%, and more preferably between 70% and 85%.

In this instance, the degree of crosslinking is determined in accordance with ASTM D 2765 by measuring a dry weight remaining after boiling the separator in a decalin solution of 135° C. for 4 hours, and calculating a ratio of the residual dry weight to an initial weight.

According to another aspect of the present disclosure, there is a lithium secondary battery including the crosslinked polyolefin separator.

The lithium secondary battery includes a cathode, an anode, and a crosslinked polyolefin separator according to one aspect of the present disclosure interposed between the cathode and the anode.

The cathode and the anode may be made by binding an electrode active material to an electrode current collector according to a method commonly known in the art. Of the electrode active material, non-limiting examples of a cathode active material include a typical cathode active material commonly used for a cathode of an electrochemical device, especially, for example, lithium manganese oxide, lithium cobalt oxide, lithium nickel oxide, lithium iron oxide, or lithium composite oxides thereof. Non-limiting examples of an anode active material include a typical anode active material commonly used for an anode of an electrochemical device, especially, for example, particles of any one active material selected from the group consisting of carbonaceous materials, such as, including natural graphite and artificial graphite; lithium-containing titanium composite oxide (LTO); and metals (Me) such as including Si, Sn, Li, Zn, Mg, Cd, Ce, Ni or Fe; alloys of the metals (Me); oxides (MeOx) of the metals (Me); and composites of the metals (Me) and carbon, or mixtures thereof. Non-limiting examples of a cathode current collector include a foil made from aluminum, nickel, or a combination thereof, and non-limiting examples of an anode current collector include a foil made from copper, gold, nickel or copper alloy, or combinations thereof.

Also, an electrolyte solution available in the lithium secondary battery according to one aspect of the present disclosure includes, but is not limited to, electrolyte solutions in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The pouring of the electrolyte solution is performed in any suitable step of a battery fabrication process based on a manufacturing process and required properties of a final product. That is, the pouring of the electrolyte solution is applied before battery assembly or in the final step of battery assembly.

A process of applying the crosslinked polyolefin separator according to one aspect of the present disclosure to the secondary battery includes a general process such as winding, as well as a lamination/stacking process and a folding process of the separator and the electrode.

Hereinafter, the present disclosure will be described in detail through examples to help understanding. The embodiments of the present disclosure, however, may take many other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLE 1

A high density polyethylene having a weight average molecular weight of 300,000 was used as a polyolefin, and a liquid paraffin oil was used as a diluent. A melting temperature of the high density polyethylene was 135° C., and a kinematic viscosity of the liquid paraffin oil at 40° C. was 40 cSt.

A weight ratio between the high density polyethylene and the liquid paraffin oil was 35:65. Trimethoxyvinylsilane was used as an alkoxy containing vinylsilane, and the content of the trimethoxyvinylsilane was 2 parts by weight per the total 100 parts by weight of the high density polyethylene and the liquid paraffin oil. (2,5-dimethyl-2,5-di(tert-butylperoxy) hexane as an initiator was added in an amount of 2 parts by weight per 100 parts by weight of the trimethoxyvinylsilane. These ingredients were fed into a twin screw extruder having an L/D of 56 and mixed to prepare a polyethylene solution, and at the same time, reactive extrusion was performed under the temperature condition of 200° C. to prepare a silane grafted polyethylene solution.

The prepared silane grafted polyethylene solution was formed in a sheet shape through a die and a cooling casting roll, and subsequently, biaxial stretching was performed using a tenter type successive stretching machine in MD direction and then in TD direction. An MD stretch ratio and a TD stretch ratio were all set to 5.5 times. The stretching temperature was 108° C. in MD and 123° C. in TD.

The liquid paraffin oil was extracted from the obtained stretched sheet using methylene chloride, and heat-setting was performed at 127° C. to produce a porous membrane. Crosslinking was performed with the obtained porous membrane placed in a steady temperature and humidity room of 80° C. and 90% humidity for 24 hours, to prepare a crosslinked polyethylene separator.

EXAMPLE 2

A crosslinked polyethylene separator was prepared by the same method as EXAMPLE 1, except crosslinking was performed in a steady temperature and humidity room for 72 hours.

COMPARATIVE EXAMPLE 1

A separator was prepared by the same method as EXAMPLE 1, except after diluent extraction, a heat-set membrane was placed in the air, not a steady temperature and humidity room.

COMPARATIVE EXAMPLE 2

A separator was prepared by the same method as EXAMPLE 1, except trimethoxyvinylsilane and an initiator were not used, and placing in a steady temperature and humidity room was eliminated.

COMPARATIVE EXAMPLE 3

A separator was prepared by the same method as EXAMPLE 1, except a low molecular weight polyethylene having a weight average molecular weight of 100,000 was used as a polyolefin.

However, rupture occurred at a stretching step after forming in a sheet shape, making it impossible to form a separator.

Property Evaluation

The properties of the separators prepared in examples 1 and 2 and comparative examples 1 and 2 were each measured by the following method, and the results were shown in the following table 1.

Degree of Crosslinkin

A degree of crosslinking of the prepared separator was measured in accordance with ASTM D 2765 by measuring a dry weight of the separator remaining after boiling a decalin solution of 135° C. for 4 hours, and calculating a ratio of the dry weight of the separator remaining after boiling to an initial weight of the separator.

Meltdown Temperature

To determine the heat resistant properties, an extent of deformation was measured under a load of 0.01N applied to the separator using a thermomechanical analysis (TMA) at a temperature increasing rate of 5° C./min. As the temperature rises, the separator shrinks and expands, and when the separator was cut off, the temperature was measured. This temperature was defined as a meltdown temperature of the separator, and the higher the temperature is, it is said that high temperature melt integrity is maintained better and higher dimensional stability is ensured.

Air Permeability

In accordance with JIS P-8117, air permeability was measured using a Gurley type air permeability tester. In this instance, the time required for 100 ml of air to flow out of a diameter of 28.6 mm and an area of 645 mm$^2$ was measured.

Tensile Strength

In accordance with ASTM D882, a specimen having a width of 15 mm was prepared, and strength and elongation was measured at rupture when pulled at a rate of 500 mm/min.

Puncture Strength

The strength at rupture was measured when pressing down the prepared porous membrane using a needle having a diameter of 1 mm (a radius of curvature: 0.5 mm) at a rate of 2 mm/sec.

TABLE 1

| ITEM | EXAMPLE 1 | EXAMPLE 2 | COMPARATIVE EXAMPLE 1 | COMPARATIVE EXAMPLE 2 |
|---|---|---|---|---|
| Thickness (μm) | 18.0 | 14.5 | 13.5 | 13.4 |
| Degree of crosslinking (%) | 80 | 78 | 10 | 0 |
| Meltdown temperature (° C.) | 186 | 190 | 148 | 142 |
| Air permeability (s/100 cc) | 440 | 430 | 405 | 112 |
| MD tensile strength (kg/cm$^2$) | 1250 | 1373 | 1530 | 1530 |
| MD elongation (%) | 227 | 210 | 230 | 224 |
| TD tensile strength (kg/cm$^2$) | 1160 | 1280 | 1500 | 1660 |
| TD elongation (%) | 150 | 183 | 125 | 123 |
| Puncture strength (gf/μm) | 18.3 | 33.7 | 32.7 | 34.9 |

Referring to Table 1, it can be seen that for the crosslinked polyethylene separators of examples 1 and 2 obtained by crosslinking the porous membrane of silane grafted polyolefin in the presence of water according to an embodiment of the present disclosure, the meltdown temperature is significantly improved and battery stability is enhanced.

Also, referring to the TMA graph of FIG. 1, it can be seen that the meltdown temperature of the crosslinked polyethylene separator greatly increases based on the crosslinking time in the presence of water.

What is claimed is:

1. A method of preparing a crosslinked polyolefin separator, comprising:
   preparing a silane grafted polyolefin solution using a polyolefin having a weight average molecular weight higher than or equal to 200,000, a diluent, an alkoxy group containing vinylsilane, and an initiator;
   forming the silane grafted polyolefin solution in a sheet shape and stretching;
   extracting the diluent from the stretched sheet to produce a porous membrane; and
   crosslinking the porous membrane in the presence of water.

2. The method of preparing a crosslinked polyolefin separator according to claim 1, wherein the preparing of a silane grafted polyolefin solution comprises feeding a polyolefin, a diluent, an alkoxy group containing vinylsilane, and an initiator into an extruder, mixing them, and performing reactive extrusion.

3. The method of preparing a crosslinked polyolefin separator according to claim 1, wherein a weight ratio between the polyolefin and the diluent in the silane grafted polyolefin solution ranges from 50:50 to 20:80.

4. The method of preparing a crosslinked polyolefin separator according to claim 1, wherein a content of the alkoxy group containing vinylsilane in the silane grafted polyolefin solution is 0.1 parts by weight to 10 parts by weight per the total 100 parts by weight of the polyolefin and the diluent, and a content of the initiator in the silane grafted polyolefin solution is 0.2 parts by weight to 100 parts by weight per 100 parts by weight of the alkoxy group containing vinylsilane.

5. The method of preparing a crosslinked polyolefin separator according to claim 1, wherein the polyolefin includes polyethylene; polypropylene; polybutylene; polypentene:polyhexene:polyoctene:copolymers of at least two of ethylene, propylene, butene, pentene, 4-methylpentene, hexene and octene; or mixtures thereof.

6. The method of preparing a crosslinked polyolefin separator according to claim 1, wherein the diluent includes at least one selected from the group consisting of paraffin oils, mineral oils, waxes, soybean oils, phthalic acid esters, aromatic ethers, fatty acids having 10 to 20 carbon atoms, fatty acid alcohols having 10 to 20 carbon atoms, and fatty acid esters.

7. The method of preparing a crosslinked polyolefin separator according to claim 1, wherein the alkoxy group containing vinylsilane is at least one selected from the group consisting of trimethoxyvinylsilane, triethoxyvinylsilane, and triacetoxyvinylsilane.

8. The method of preparing a crosslinked polyolefin separator according to claim 1, wherein the forming in a sheet shape and stretching comprises extruding the silane grafted polyolefin solution through a die to form an extruded product; cooling the extruded product and forming in a sheet shape; and stretching the product formed in a sheet shape sheet biaxially in a longitudinal direction and a transverse direction to form a stretched sheet.

9. The method of preparing a crosslinked polyolefin separator according to claim 1,
before the crosslinking, further comprising:
heat-setting the porous membrane.

10. The method of preparing a crosslinked polyolefin separator according to claim 1, wherein the crosslinking is performed on the porous membrane under the conditions of 50° C. to 100° C. of temperature and 50% to 100% of humidity.

* * * * *